United States Patent
Li et al.

(10) Patent No.: US 7,390,529 B2
(45) Date of Patent: Jun. 24, 2008

(54) FREE LAYER FOR CPP GMR HAVING IRON RICH NIFE

(75) Inventors: Min Li, Dublin, CA (US); Cheng T. Horng, San Jose, CA (US); Cherng Chyi Han, San Jose, CA (US); Yu-Hsia Chen, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 660 days.

(21) Appl. No.: 10/854,651

(22) Filed: May 26, 2004

(65) Prior Publication Data

US 2005/0264954 A1    Dec. 1, 2005

(51) Int. Cl.
   *B05D 5/12* (2006.01)
(52) U.S. Cl. .................. 427/127; 427/128; 427/132; 29/603.07; 360/324.12
(58) Field of Classification Search .................. 427/127, 427/128, 132, 131; 29/603.07; 360/324.12
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 6,469,879 B1 * | 10/2002 | Redon et al. | 360/324.2 |
| 6,473,279 B2 * | 10/2002 | Smith et al. | 360/324.12 |
| 6,562,199 B2 | 5/2003 | Shimazawa et al. | 204/192.1 |
| 6,686,068 B2 | 2/2004 | Carey et al. | 428/692 |
| 2004/0047190 A1 * | 3/2004 | Odagawa et al. | 365/200 |
| 2004/0091743 A1 * | 5/2004 | Kula et al. | 428/692 |
| 2006/0061914 A1 * | 3/2006 | Hoshiya et al. | 360/324.1 |

OTHER PUBLICATIONS

Co-pending U.S. Patent Application, "Improved Seed/AFM Combination for CPP GMR Device", U.S. Appl. No. 10/886,288, filed Jul. 7, 2004, assigned to the same assignee.
The 2002 IEEE Int'l Magnetic Conf., Apr. 28-May 2, RAI Congress, Center, Amsterdam, The Netherlands, Digest Intermag 2002, Section GA 02, "The Applicability of CPP-GMR for Over 100Gbpsi".

* cited by examiner

*Primary Examiner*—Alain L Bashore
(74) *Attorney, Agent, or Firm*—Saile Ackerman LLC; Stephen B. Ackerman

(57) ABSTRACT

By using a free layer that includes a NiFe layer containing between 65 and 72 atomic percent iron, an improved CPP GMR device has been created. The resulting structure yields a higher CPP GMR ratio than prior art devices, while maintaining free layer softness and acceptable magnetostriction. A process for manufacturing the device is also described.

19 Claims, 1 Drawing Sheet

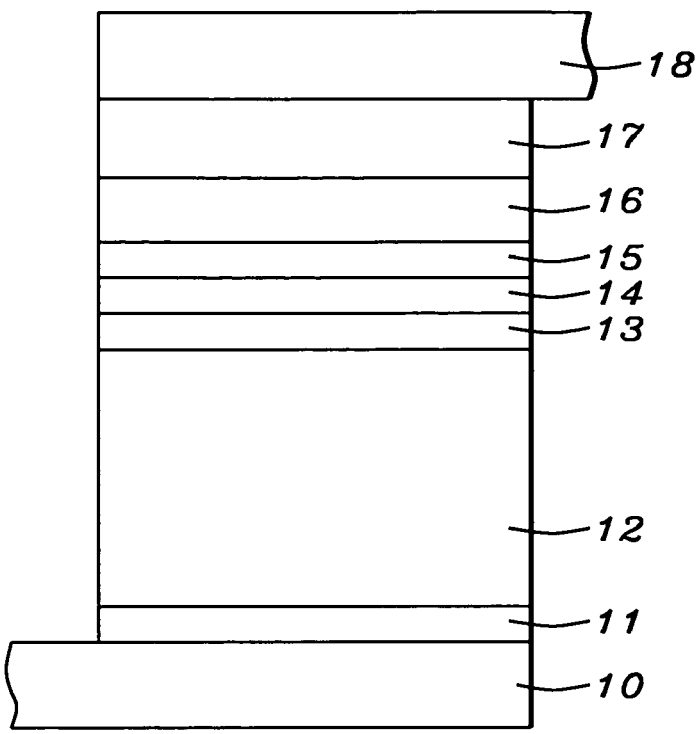
FIG. 1 - Prior Art
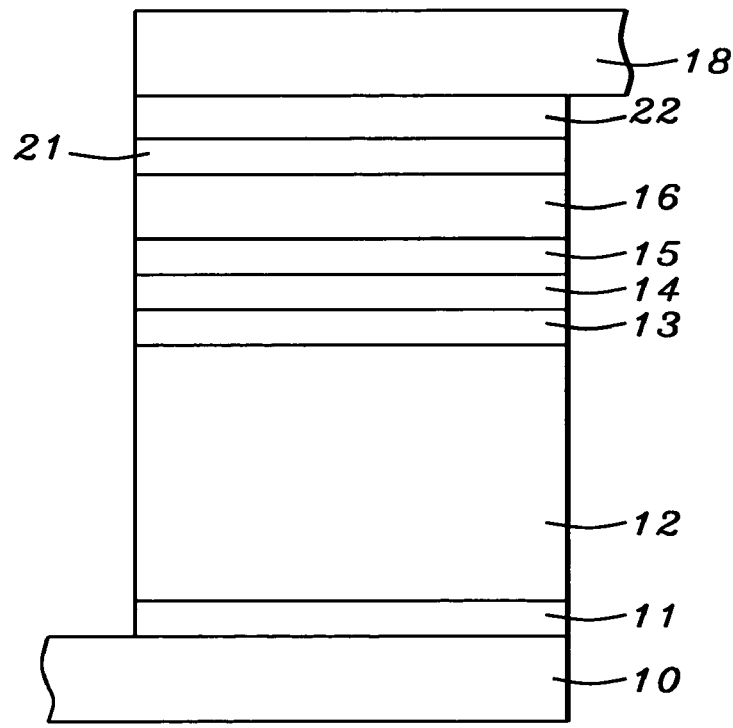
FIG. 2

FREE LAYER FOR CPP GMR HAVING IRON RICH NIFE

FIELD OF THE INVENTION

The invention relates to the general field of CPP GMR read heads with particular reference to the free layer sub-structure.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 (lying on lower conductive lead 10) on which is antiferromagnetic layer 12 whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1).

Next is a non-magnetic spacer layer 16 on which is low coercivity (free) ferromagnetic layer 17. A contacting layer such as lead 18 lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Earlier GMR devices were designed so as to measure the resistance of the free layer for current flowing parallel to its two surfaces. However, as the quest for ever greater densities has progressed, devices that measure current flowing perpendicular to the plane (CPP), as exemplified in FIG. 1, have also emerged. CPP GMR heads are considered to be promising candidates for the over 100 Gb/in$^2$ recording density domain (see references 1-3 below).

A routine search of the prior art was performed with the following references of interest being found:

No references were found that disclosed a specific percentage of Fe in the free layer. In U.S. Pat. No. 6,686,068 (Carey et al), U.S. Pat. No. 6,562,199 (Shimazawa et al), U.S. Pat. No. 6,473,279 (Smith et al), and U.S. Pat. No. 6,469,879 (Redon et al), free layers comprising materials such as NiFe and CoFe are disclosed. U.S. 2004/0047190 (Odagawa et al) describes a Ni-rich free layer.

An improved free layer in a CPP spin valve needs to achieve three objectives:
1) higher CPP GMR ratio;
2) low coercivity i.e., good magnetic softness; and
3) low positive magnetostriction.

REFERENCES

[1] M. Lederman et al U.S. Pat. No. 5,627,704.
[2] J. W. Dykes et al U.S. Pat. No. 5,668,688
[3] Min Li et al. U. S. Patent Publication No. 2006/0007605 "Spin valve structure with enhanced CPP GMR, and process for making it"

SUMMARY OF THE INVENTION

It has been an object of at least one embodiment of the present invention to provide a CPP GMR magnetic read head having improved stability and performance.

Another object of at least one embodiment of the present invention has been to provide a process for manufacturing said read head.

Still another object of at least one embodiment of the present invention has been that said process be compatible with existing processes for the manufacture of CPP GMR devices.

These objects have been achieved by replacing the conventional free layer with a layer that includes a NiFe layer containing between 65 and 72 atomic percent iron. Other possible configurations include laminates of this layer with $CoFe_{(25\%)}$, $CoFe_{(9\text{-}75\%)}$, or $NiFe_{(16\text{-}21\%)}$. The result is an improved CPP GMR device that has a higher CPP GMR ratio than prior art devices, while still maintaining free layer softness and acceptable magnetostriction. A process for manufacturing the device is also described.

BRIEF DESCRIPTION OF THE DRAWINGS

FIG. 1 shows a GMR stack of the prior art which has a conventional free layer.

FIG. 2 shows a GMR stack according to the teachings of the present invention.

DESCRIPTION OF THE PREFERRED EMBODIMENTS

In a CPP spin valve structure, higher spin polarization ferromagnetic material can improve CPP GMR significantly, such as Fe50Co. It is also known that Fe rich NiFe has higher spin polarization. The present invention shows how this may be applied to the NiFe component of the free layer to improve the CPP GMR.

It is well known that besides the requirement of a reasonable RA (resistance-area product) and higher CPP GMR, the free layer of the CPP GMR structure has to be magnetically soft and its magnetostriction constant needs to be within the desirable range (positive $1\text{-}3\times10^{-6}$).

In conventional (standard) CPP spin valve structures, composite free layers made of $CoFe_{(10\%)}$ and $NiFe_{(19\%)}$ have been used. Such films are supposedly non magnetostrictive (i.e. the magnetostriction coefficient is around $10^{-7}$. For CoFe films, magnetostriction increases with higher Fe composition while for NiFe films, negative magnetostriction is obtained at lower Fe concentrations. The present invention takes advantage of these characteristics by increasing the percentage of iron in the NiFe portion of this laminate, thereby improving the CPP GMR while still maintaining free layer softness and acceptable magnetostriction.

Referring now to FIG. 2, we provide a description of the process of the present invention. In the course of this description, the structure of the present invention will also become apparent.

The process begins with the formation of lower lead 10 onto which is deposited seed layer 11 followed by pinning layer 12. Layer 12 comprises a suitable antiferromagnetic material such as IrMn and it is deposited to a thickness between 45 and 80 Angstroms. Layer 13 (AP2), the first of the two antiparallel layers that will form the synthetic AFM pinned layer, is then deposited onto layer 12. This is followed by layer of AFM coupling material 14 and then AP1 layer is deposited thereon. Next, non-magnetic spacer layer 16 is deposited on AP1 layer 15.

Note that although layer 16 is referred to simply as a "non-magnetic spacer" layer, in practice it is a multilayer structure that includes Cu/AlCU/PIT/IAO/Cu, AICU is a discontinuous layer of alumina having Cu in the holes, PIT is an abbreviation for Pre-ion Treatment and IAO stands for ion assisted oxidation. For the sake of simplification, we will continue to refer to 'non-magnetic spacers' but it should be borne in mind that they are actually the more complicated structures described above.

Now follows a key feature of the invention which requires the free layer to include a NiFe portion wherein iron is present at a concentration of from 65-72 atomic percent. Said NiFe layer (layer 21 In FIG. 2) may stand alone or it may laminated with a second layer (layer 22 in FIG. 2). Examples of the latter layer include $CoFe_{(25\%)}$ (our preferred configuration), $CoFe_{(9-75\%)}$, and $NiFe_{(16-21\%)}$. Note that the improvements summarized in TABLE I below will not be obtained if the ion concentration in layer 21 lies outside the 65-72 atomic percent range.

The resulting free layer has a magnetostriction constant that is between 1 and $3\times10^{-6}$ (positive) and a coercivity between about 5 and 30 Oe.

The process concludes with the deposition of upper lead layer 18, the completed structure being now ready to serve as a CPP GMR read head having a GMR ratio of at least 11%.

Confirmatory Results

To confirm the effectiveness of the invention, the following structures were formed and then evaluated as CPP GMR readers. The number after each named layer is thickness in Angstroms:

A. (prior art): Ta5/NiCr45/IrMn70/$CoFe_{(25\%)}$48/Ru7.5/ [$CoFe_{(50\%)}$12/Cu3]3/$CoFe_{(50\%)}$Co12/Cu4.2/AlCu8/PIT/ IAO/Cu2/$CoFe_{(25\%)}$10/$NiFe_{(17.5\%)}$35/Cu30/Ru10/Ta60/ Ru10

B. (invention) Ta5/NiCr45/IrMn70/$CoFe_{(25\%)}$48/Ru7.5/ [$CoFe_{(50\%)}$12/Cu3]3/$CoFe_{(50\%)}$Co12/Cu4.2/AlCu8/PIT/ IAO/Cu2/$CoFe_{(25\%)}$10/$NiFe_{(70\%)}$35/Cu30/Ru10/Ta60/Ru10

The results are summarized in TABLE I below:

TABLE I

| | free layer structure | RA (ohm·μm²) | DR/R (%) | Hc (Oe) | Hin (Oe) | Magneto-striction |
|---|---|---|---|---|---|---|
| A | $CoFe_{(25\%)}$10/ $NiFe_{(17\%)}$35 | 0.3 | 9 | 9 | 11 | $2.3 \times 10^{-6}$ |
| B | $CoFe_{(25\%)}$10/ $NiFe_{(70\%)}$35 | 0.31 | 11.5 | 15 | 16 | $2.0 \times 10^{-6}$ |

As seen in TABLE I above, RA of the invented structure is 0.31 ohm.μm². Thus, the impedance of a CPP GMR device element measuring 0.1 μm×0.1 μm is around 31 ohm. This is in the useful range of the spin valve read head for greater than 100 Gb/in² density. It can also be seen that, for a $CoFe_{(25\%)}$ 10/$NiFe_{(70\%)}$35 free layer (structure B) there is a higher CPP GMR ratio relative to prior art structure A. The free layer coercivity and interlayer coupling (Hin) are slightly larger than the reference but are still in the usable range. The magnetostriction of structure B is similar to that of A. The buffer layer/pinning layer/AP2 in this invention CPP configuration is Ta/NiCr/IrMn70/$CoFe_{(25\%)}$48.

In particular, by using an iron rich NiFe in the free layer as described above, a CPP GMR improvement of about 28% is obtained, without significant degradation of other required free layer magnetic properties.

What is claimed is:

1. A process to manufacture a CPP GMR read head, comprising:

depositing, in unbroken succession on a lower lead layer, a seed layer and a pinning layer;

on said pinning layer, depositing a pinned layer;

depositing a non magnetic spacer layer on said pinned layer;

on said non magnetic spacer layer, depositing a free layer that further comprises a layer of nickel iron, containing between about 65 and 72 atomic percent iron, and a layer of cobalt iron containing about 25 atomic percent iron; and on said free layer, depositing a capping layer and then an upper lead layer, thereby forming said CPP GMR read head.

2. The process described in claim 1 wherein said pinning layer is IrMn deposited to a thickness between 45 and 80 Angstroms.

3. The process described in claim 1 wherein said layer of nickel iron is deposited to a thickness of between about 15 and 50 Angstroms.

4. The process described in claim 1 wherein said layer of cobalt iron is deposited to a thickness of between about 3 and 15 Angstroms.

5. The process described in claim 1 wherein said pinned layer is a synthetic antiferromagnet that comprises oppositely magnetized ferromagnetic layers separated by an antiferromagnetic coupling layer.

6. A process to manufacture a CPP GMR read head, comprising:

depositing, in unbroken succession on a lower lead layer, a seed layer and a pinning layer;

on said pinning layer, depositing a pinned layer;

depositing a non magnetic spacer layer on said pinned layer;

on said non magnetic spacer layer, depositing a free layer that further comprises a layer of nickel iron, containing between about 65 and 72 atomic percent iron, and a layer of cobalt iron containing between about 9 and 75 atomic percent iron; and on said free layer, depositing a capping layer and then an upper lead layer, thereby forming said CPP GMR read head.

7. The process described in claim 6 wherein said pinning layer is IrMn deposited to a thickness between 45 and 80 Angstroms.

8. The process described in claim 6 wherein said layer of nickel iron is deposited to a thickness of between about 15 and 50 Angstroms.

9. The process described in claim 6 wherein said layer of cobalt iron is deposited to a thickness of between about 3 and 15 Angstroms.

10. The process described in claim 6 wherein said pinned layer is a synthetic antiferromagnet that comprises oppositely magnetized ferromagnetic layers separated by an antiferromagnetic coupling layer.

11. A process to manufacture a CPP GMR read head, comprising:
   depositing, in unbroken succession on a lower lead layer, a seed layer and a pinning layer;
   on said pinning layer, depositing a pinned layer;
   depositing a non magnetic spacer layer on said pinned layer;
   on said non magnetic spacer layer, depositing a free layer that is a layer of nickel iron, containing between about 65 and 72 atomic percent iron; and
   on said free layer, depositing a capping layer and then an upper lead layer, thereby forming said CPP GMR read head.

12. The process described in claim 11 wherein said pinning layer is IrMn deposited to a thickness between 45 and 80 Angstroms.

13. The process described in claim 11 wherein said layer of nickel iron is deposited to a thickness of between about 15 and 50 Angstroms.

14. The process described in claim 11 wherein said pinned layer is a synthetic antiferromagnet that comprises oppositely magnetized ferromagnetic layers separated by an antiferromagnetic coupling layer.

15. A process to manufacture a CPP GMR read head, comprising:
   depositing, in unbroken succession on a lower lead layer, a seed layer and a pinning layer;
   on said pinning layer, depositing a pinned layer;
   depositing a non magnetic spacer layer on said pinned layer;
   on said non magnetic spacer layer, depositing a free layer that further comprises a first layer of nickel iron, containing between about 65 and 72 atomic percent iron, and a second layer of nickel iron containing between about 16 and 21 atomic percent iron; and
   on said free layer, depositing a capping layer and then an upper lead layer, thereby forming said CPP GMR read head.

16. The process described in claim 15 wherein said pinning layer is IrMn deposited to a thickness between 45 and 80 Angstroms.

17. The process described in claim 15 wherein said first layer of nickel iron is deposited to a thickness of between about 5 and 30 Angstroms.

18. The process described in claim 15 wherein said second layer of nickel iron is deposited to a thickness of between about 10 and 45 Angstroms.

19. The process described in claim 15 wherein said pinned layer is a synthetic antiferromagnet that comprises oppositely magnetized ferromagnetic layers separated by an antiferromagnetic coupling layer.

* * * * *